(12) United States Patent
Knowles

(10) Patent No.: US 7,654,907 B2
(45) Date of Patent: Feb. 2, 2010

(54) APPARATUS FOR DAMPING THE TORSIONAL EXCITATION OF A DRIVE SHAFT

(75) Inventor: Grahame Knowles, Lincoln (GB)

(73) Assignee: Siemens Aktiengesellshcaft, Munich (DE)

( * ) Notice: Subject to any disclaimer, the term of this patent is extended or adjusted under 35 U.S.C. 154(b) by 442 days.

(21) Appl. No.: 11/628,229

(22) PCT Filed: Jun. 9, 2005

(86) PCT No.: PCT/EP2005/052668

§ 371 (c)(1),
(2), (4) Date: Dec. 1, 2006

(87) PCT Pub. No.: WO2005/121594

PCT Pub. Date: Dec. 22, 2005

(65) Prior Publication Data

US 2007/0240959 A1    Oct. 18, 2007

(30) Foreign Application Priority Data

Jun. 12, 2004  (GB) ................. 0413153.8

(51) Int. Cl.
*F16D 3/80*  (2006.01)
(52) U.S. Cl. ...................... 464/27; 464/180
(58) Field of Classification Search ........... 464/24, 464/27, 97, 170, 180; 180/337, 380
See application file for complete search history.

(56) References Cited

U.S. PATENT DOCUMENTS

| 2,184,202 A | * | 12/1939 | Tschanz |
| 4,160,390 A | | 7/1979 | Spaetgens |
| 4,333,319 A | * | 6/1982 | Bischoff ................ 464/27 |
| 5,935,007 A | | 8/1999 | Yang |
| 6,095,923 A | | 8/2000 | Kageyama |
| 2003/0203758 A1 | | 10/2003 | Guo et al. |

FOREIGN PATENT DOCUMENTS

| DE | 12 47 763 | | 8/1967 |
| DE | 74 21 465 | U | 11/1975 |
| DE | 25 33 477 | A1 | 2/1977 |
| DE | 37 40 756 | A1 | 6/1989 |
| DE | 198 39 471 | A1 | 4/1999 |
| EP | 0 567 351 | A1 | 10/1993 |
| EP | 0 592 297 | A1 | 4/1994 |
| EP | 0 980 774 | A2 | 2/2000 |
| FR | 27 02 012 | A1 | 9/1994 |
| FR | 27 66 444 | A1 | 1/1999 |
| JP | 04366027 | A | 12/1992 |

* cited by examiner

*Primary Examiner*—Greg Binda

(57) ABSTRACT

In one aspect, an apparatus for damping the torsional excitation of a drive shaft is provided. The apparatus includes: a member secured to one end of the drive shaft and extending along the drive shaft; and damping means secured to the other end of the drive shaft for damping vibration of the end of the member remote from the securing of the member to the one end of the drive shaft. A hydraulic circuit for damping the vibration of a component in a first dimension, the circuit including: a pair of hydraulic cylinders disposed so that the actions of the pistons of the cylinders oppose one another in the first dimension, the pistons communicating with the component; and a fluid flow path between the cylinders, vibration of the component in the first dimension causing fluid flow between the cylinders to damp the vibration.

6 Claims, 4 Drawing Sheets

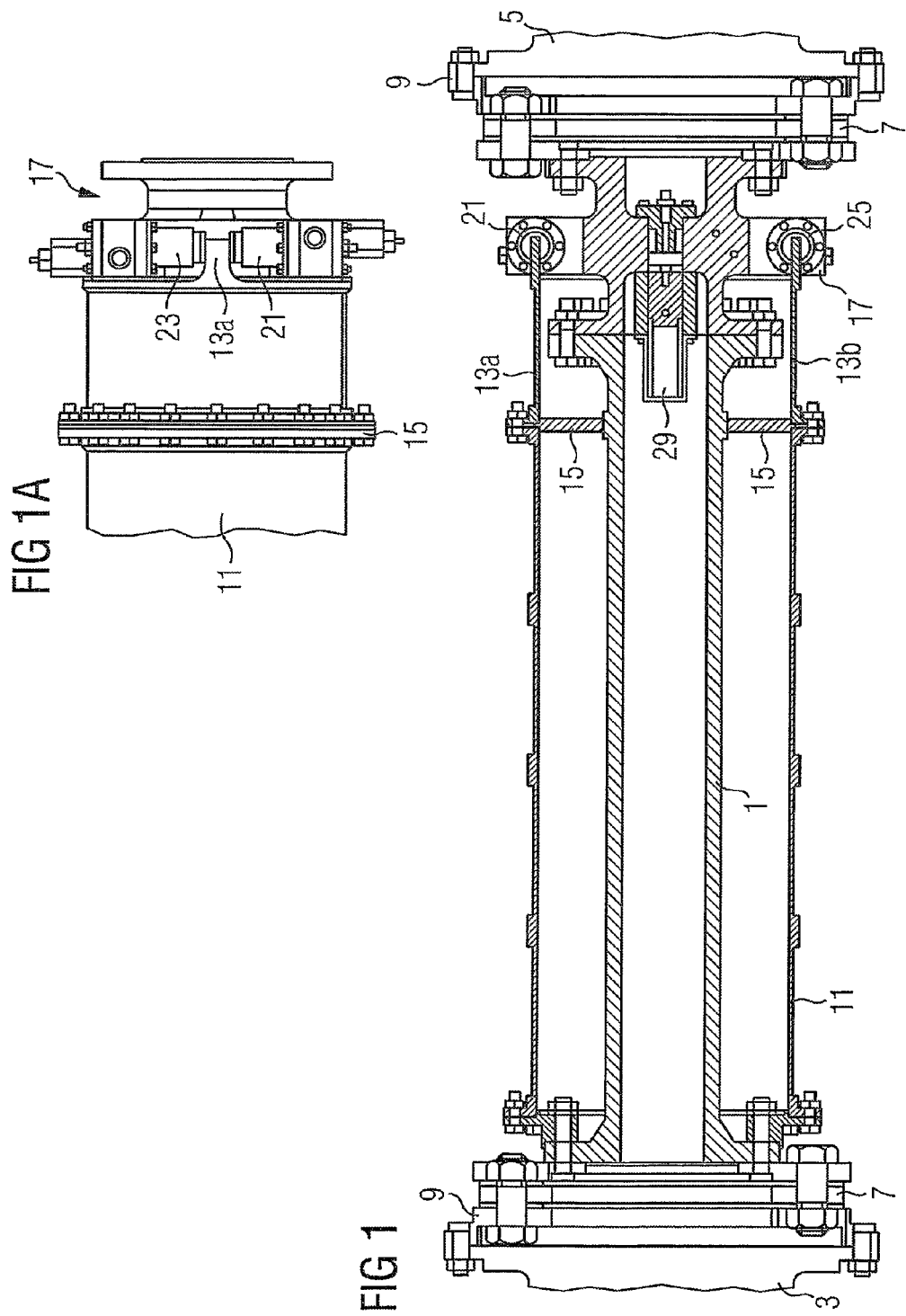

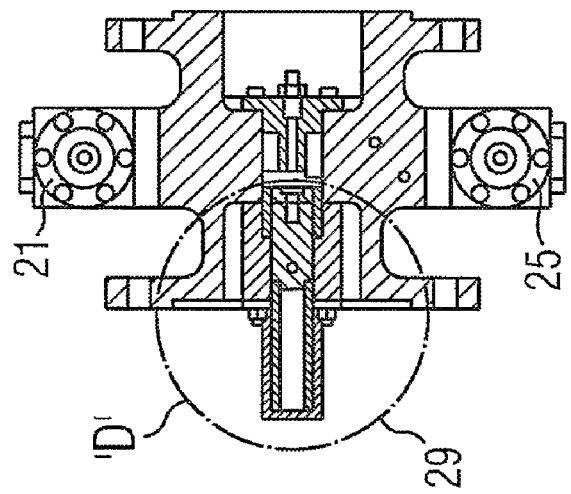
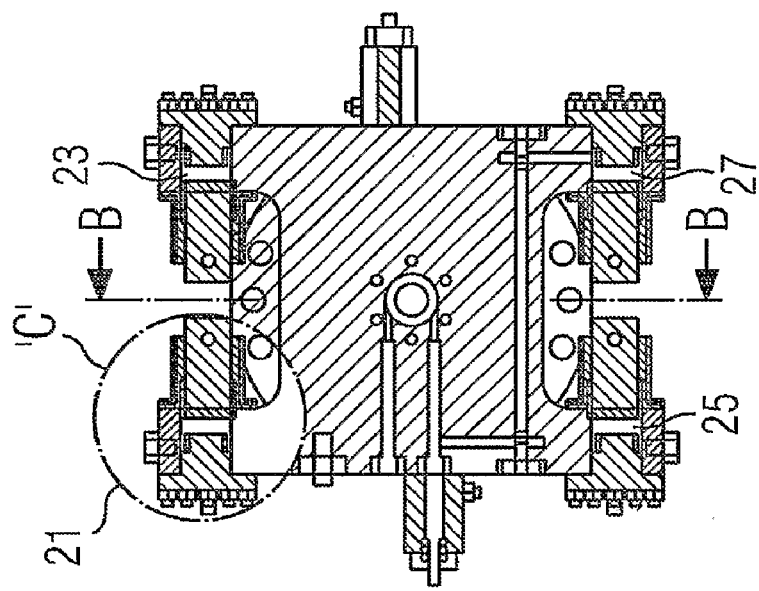
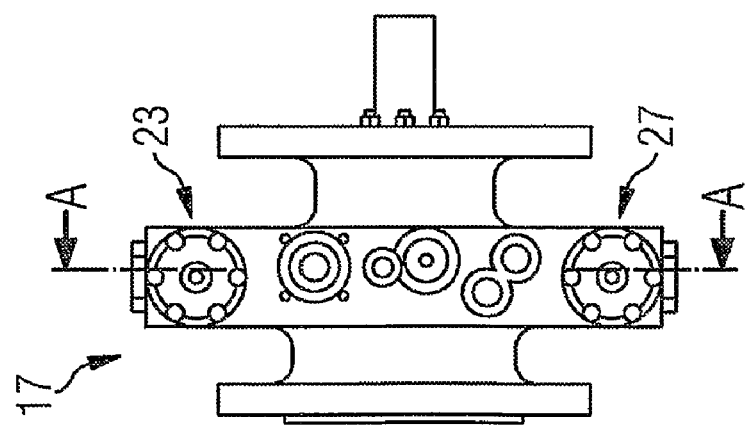

DETAIL C

DETAIL D

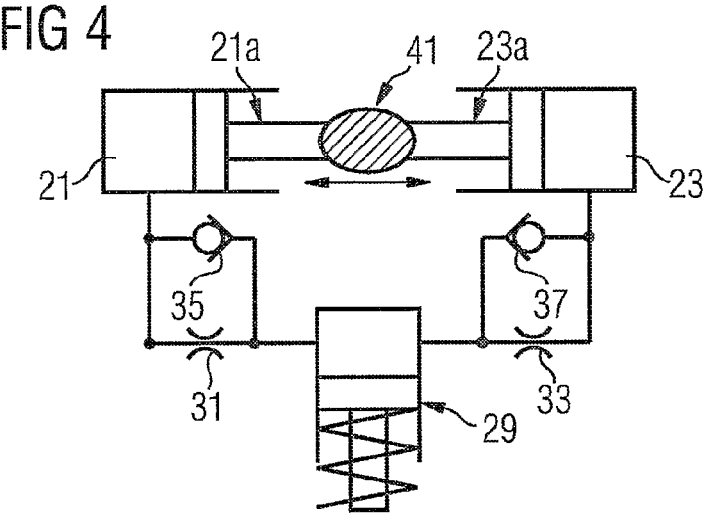
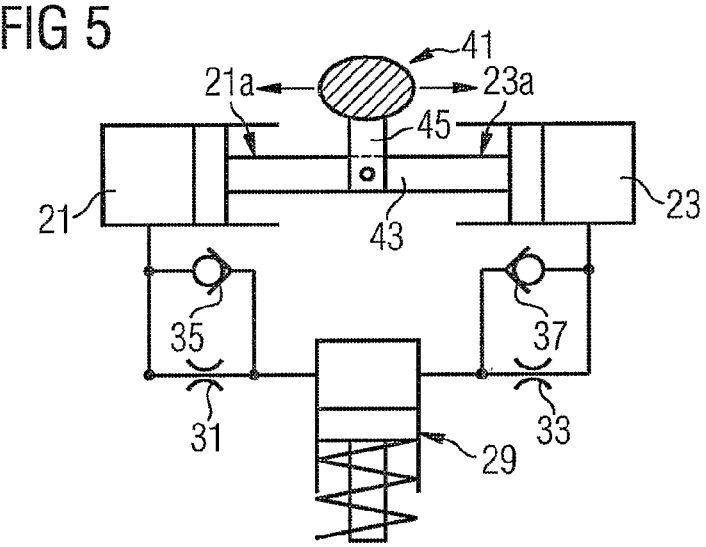
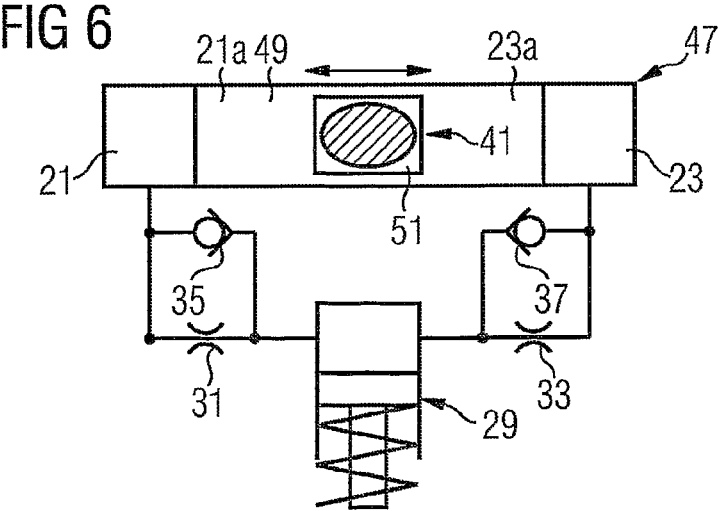

APPARATUS FOR DAMPING THE TORSIONAL EXCITATION OF A DRIVE SHAFT

CROSS REFERENCE TO RELATED APPLICATIONS

This application is the US National Stage of International Application No. PCT/EP2005/052668, filed Jun. 9, 2005 and claims the benefit thereof. The International Application claims the benefits of Great Britain application No. 0413153.8 GB filed Jun. 12, 2004, both of the applications are incorporated by reference herein in their entirety.

FIELD OF INVENTION

This invention relates to an apparatus for damping the torsional excitation of a drive shaft.

BACKGROUND OF INVENTION

It is known to design drive shafts such that their critical speeds (the speeds at which they resonate) do not coincide with the speeds of operation of the equipment being driven. This helps avoid torsional excitation of the drive shaft. It is not always possible to so design a drive shaft. Further, torsional excitation of a drive shaft may occur due to operation of other equipment not driven by the drive shaft but in the same vicinity. Torsional excitation of a drive shaft may also occur due to operation of equipment connected to the equipment being driven, e.g. connected by an electrical circuit. This is especially so since the advent of high powered electronic control equipment utilizing thyristors.

SUMMARY OF INVENTION

When a drive shaft is not robust enough to cope with the torsional excitation it experiences, this is dealt with by: increasing the robustness of the drive shaft; reducing the magnitude of the torsional stresses applied to the drive shaft; and damping the torsional excitation of the drive shaft itself. The present invention relates to the last of these three alternatives.

According to a first aspect of the present invention there is provided an apparatus for damping the torsional excitation of a drive shaft, said apparatus comprising: a member secured to one end of the drive shaft and extending along the drive shaft; and damping means secured to the other end of the drive shaft for damping vibration of the end of said member remote from the securing of the member to said one end of the drive shaft.

The member is suitably a tube concentric with said drive shaft.

The tube may include a pair of actuation levers which extend from the end of said tube opposite the end secured to said drive shaft, said levers being located on opposite sides of said tube, said damping means damping vibration of said levers.

The tube may include a radially inwardly extending support located at the end of said tube opposite the end secured to said drive shaft, the support bearing against said drive shaft so as to maintain concentricity of said tube and said drive shaft.

The damping means is suitably hydraulic.

Preferably, the hydraulic damping means comprises: first and second pairs of hydraulic cylinders; and a fluid flow path between said cylinders, the first pair of hydraulic cylinders being disposed so that the actions of the pistons of the cylinders oppose one another in the dimension of vibration of one said actuation lever, the pistons communicating with the one actuation lever, the second pair of hydraulic cylinders being disposed so that the actions of the pistons of the cylinders oppose one another in the dimension of vibration of the other actuation lever, the pistons communicating with the other actuation lever, torsional excitation of said tube causing vibration of said actuation levers resulting in fluid flow between the cylinders to damp the vibration.

Preferably, the fluid flow path between said cylinders includes a pressurized reservoir.

Preferably, the fluid flow path comprises first and second sections, each section comprising first and second branches connected in parallel, one branch comprising a flow restrictor, the other branch comprising a check valve that permits fluid flow only in a direction away from said reservoir, said first section being connected between said reservoir and both one cylinder of said first pair and the diagonally opposite cylinder of said second pair, said second section being connected between said reservoir and both the other cylinder of said first pair and the diagonally opposite cylinder of said second pair.

According to a second aspect of the present invention there is provided a hydraulic circuit for damping the vibration of a component in a first dimension, said circuit comprising: a pair of hydraulic cylinders disposed so that the actions of the pistons of the cylinders oppose one another in said first dimension, said pistons communicating with said component; and a fluid flow path between said cylinders, vibration of said component in said first dimension causing fluid flow between the cylinders to damp the vibration.

Preferably, the fluid flow path between said cylinders includes a pressurized reservoir.

Preferably, the fluid flow path comprises a first section between said reservoir and one said cylinder and a second section between said reservoir and the other said cylinder, each said section comprising first and second branches connected in parallel, one branch comprising a flow restrictor, the other branch comprising a check valve that permits fluid flow only in a direction away from said reservoir.

According to a third aspect of the present invention there is provided a hydraulic circuit for damping the vibration of a component in a first dimension, said circuit comprising: first and second pumping means which communicate with said component; and a fluid flow path between said first and second pumping means, said fluid flow path comprising: a pressurized reservoir; a first section between said reservoir and said first pumping means; and a second section between said reservoir and said second pumping means, each said section comprising first and second branches connected in parallel, one branch comprising a flow restrictor, the other branch comprising a check valve that permits fluid flow only in a direction away from said reservoir, vibration of said component in said first dimension causing fluid flow between the first and second pumping means to damp the vibration.

BRIEF DESCRIPTION OF THE DRAWINGS

The invention will now be described, by way of example, with reference to the accompanying drawings, in which:

FIG. 1 is a longitudinal cross-section through a drive shaft and an apparatus in accordance with the present invention for damping torsional excitation of the drive shaft;

FIG. 1a is a top view of a portion of the apparatus in accordance with the present invention shown in FIG. 1;

FIG. 2a is a view of a hydraulic torsional damper of the apparatus in accordance with the present invention shown in FIG. 1;

FIG. 2b is a cross-section on the line A-A in FIG. 2a;

FIG. 2c is a cross-section on the line B-B in FIG. 2b;

FIG. 4 illustrates a modification to the circuit of FIG. 3;

FIG. 5 illustrates a modification to the circuit of FIG. 4; and

FIG. 6 illustrates an alternative modification to the circuit of FIG. 4.

DETAILED DESCRIPTION OF INVENTION

Figure 2D:
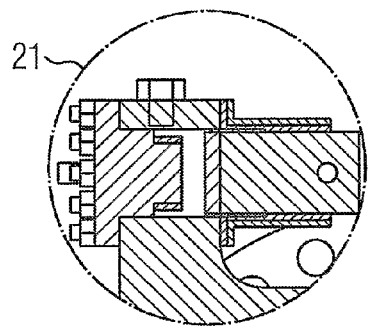
FIG. 2d is an enlargement of detail E in FIG. 2b.

Referring to FIGS. 1 and 1a, a drive shaft 1 is driven by a driver 3, and drives driven unit 5. Drive shaft 1 is connected to driver 3 and driven unit 5 by means of flexible elements 7 and adaptor plates 9. The apparatus in accordance with the present invention for damping torsional excitation of drive shaft 1 comprises a torsionally stiff transfer tube 11, a pair of torsionally stiff actuation levers 13a, 13b, a support 15, and hydraulic torsional damper 17. Damper 17 is connected between drive shaft 1 and driven unit 5. Transfer tube 11 runs concentric with drive shaft 1, and is secured to the end of drive shaft 1 connected to driver 3. Actuation levers 13a, 13b are located on opposite sides of transfer tube 11, and extend from the end of tube 11 remote from the securing of tube 11 to drive shaft 1. Levers 13a, 13b extend so as to communicate with hydraulic torsional damper 17. The precise nature of this communication will be described below. Support 15 is also located at the end of tube 11 remote from the securing of tube 11 to drive shaft 1. Support 15 extends radially inward so as to bear against drive shaft 1 to maintain concentricity of tube 11 and drive shaft 1 (especially at high rotational speed). Support 15 does not restrict torsional twist of drive shaft 1.

An oscillating twist in drive shaft 1 due to torsional excitation of shaft 1 results in corresponding relative rotary movement between actuation levers 13a, 13b and hydraulic torsional damper 17. For example, take the instance where the driven unit end of drive shaft 1 is twisted clockwise, and consequently the driver end of shaft 1 is twisted anti-clockwise. The clockwise twisting of the driven unit end causes a corresponding clockwise twist of damper 17 connected to this end, and the anti-clockwise twisting of the driver end causes a corresponding anti-clockwise twist of transfer tube 11 secured to this end and hence a corresponding anti-clockwise twist of levers 13a, 13b. The relative angular position of damper 17 and levers 13a, 13b corresponds to the twist at that instant of drive shaft 1.

Figure 2E:
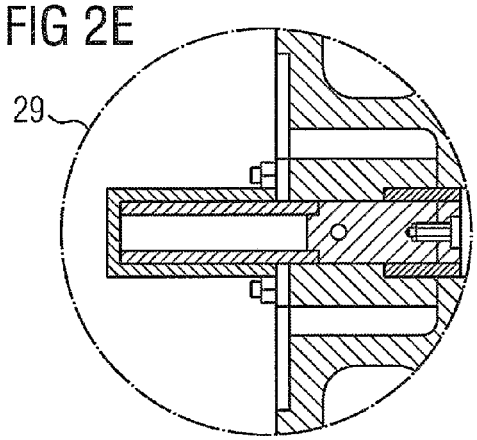
FIG. 2e is an enlargement of detail F in FIG. 2c.
Figure 3:
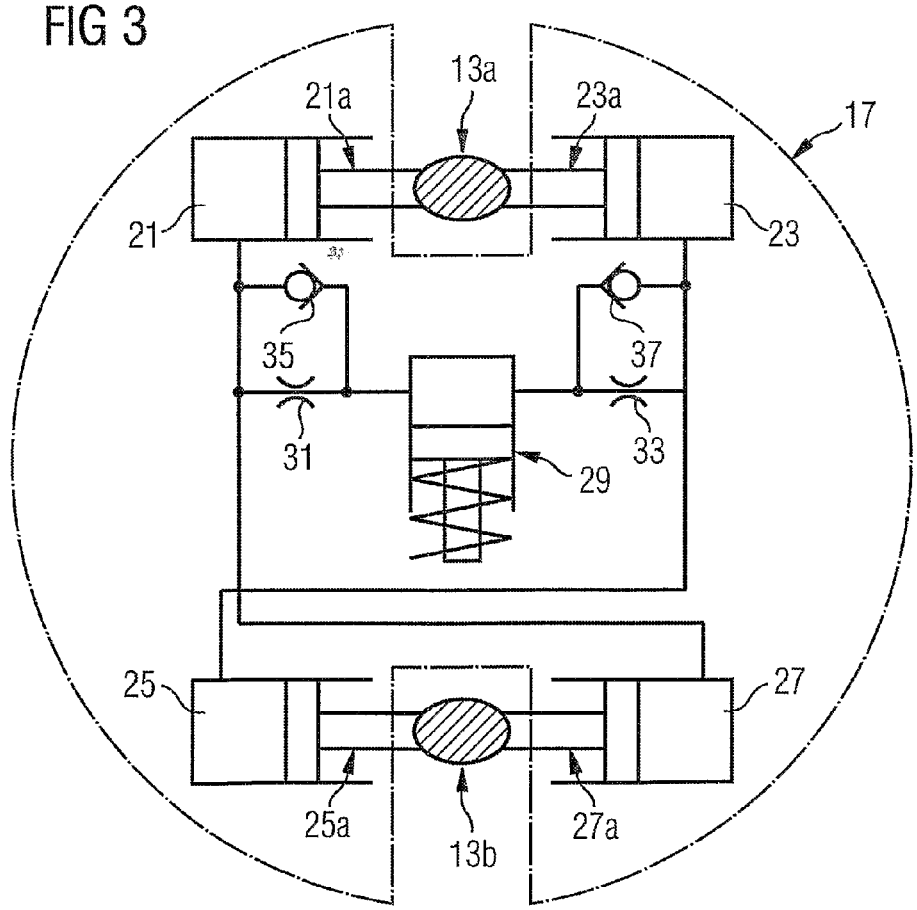
FIG. 3 illustrates a hydraulic damping circuit of the hydraulic torsional damper shown in FIG. 2.

Referring also to FIGS. 2 and 3, hydraulic torsional damper 17 comprises a first pair of hydraulic cylinders 21, 23, a second pair of hydraulic cylinders 25, 27, a pressurized reservoir 29, restrictor orifices 31, 33, and check valves 35, 37.

The first pair of hydraulic cylinders 21, 23 are disposed opposite one another in the line of vibration of actuation lever 13a. Each cylinder 21, 23 includes a piston 21a, 23a which bears against an opposite side of lever 13a. Similarly, the second pair of hydraulic cylinders 25, 27 are disposed opposite one another in the line of vibration of actuation lever 13b, and each cylinder 25, 27 includes a piston 25a, 27a which bears against an opposite side of lever 13b.

The fluid flow path between diagonally opposite cylinders 23, 25 and pressurized reservoir 29 comprises first and second branches connected in parallel. One branch comprises restrictor orifice 33, the other branch comprises check valve 37. Similarly, the fluid flow path between diagonally opposite cylinders 21, 27 and pressurized reservoir 29 comprises first and second branches connected in parallel, one branch comprising restrictor orifice 31, the other branch comprising check valve 35. Check valves 35, 37 permit fluid flow only in a direction away from pressurized reservoir 29.

Pressurized reservoir 29 is in the form of a spring loaded hydraulic cylinder. Damper 17 also includes a hydraulic fluid filler port (not shown) and strategically placed bleed valves (only one of which is shown, see FIG. 2d). The filler port/bleed valves enable all gas/air to be displaced by pressurized fluid from an external source. Hydraulic cylinders 21, 23, 25, 27, 29 and check valves 35, 37 are designed to be virtually leak-free in operation. With regard to cylinders 21, 23, 25, 27, 29, this is achieved by the use of so called "rolling diaphragm" seals, see FIGS. 2d and 2e. Such seals are also low friction to preserve the linear viscous damping characteristic of damper 17, see below. Restrictor orifices 31, 33 are designed so that the flow therethrough is laminar. Check valves 35, 37 are designed so as to be low pressure drop and fast response.

The operation of hydraulic torsional damper 17 is as follows.

With particular reference to FIG. 3, if, due to torsional excitation of drive shaft 1, actuation levers 13a, 13b rotate in a clockwise direction, then this pushes inward pistons 23a, 25a of cylinders 23, 25. Hydraulic fluid is displaced out of cylinders 23, 25, across restrictor orifice 33 (note check valve 37 permits flow only in a direction away from pressurized reservoir 29) and into reservoir 29. Due to the flow into reservoir 29 and the pressurizing action of the spring of reservoir 29, fluid also leaves reservoir 29. It crosses check valve 35 to reach cylinders 21, 27, pushing pistons 21a, 27a outward so as to remain in abutment with levers 13a, 13b. The pressure difference across both first pair of cylinders 21, 23 and second pair of cylinders 25, 27 equals the pressure difference across restrictor orifice 33, and is proportional to the torque opposing the angular twist of drive shaft 1. As the flow across restrictor orifice 33 is dependent upon the angular twist velocity of drive shaft 1, a true damping torque is produced which is proportional to the angular twist velocity. Provided laminar flow is maintained across restrictor orifice 33, the damping is purely linear and viscous in nature.

If torsional excitation of drive shaft 1 causes levers 13a, 13b to rotate in an anti-clockwise direction, then operation of the hydraulic damping circuit is as before, but in reverse. Thus, fluid leaves cylinders 21, 27, crosses restrictor orifice 31, enters and leaves reservoir 29, crosses check valve 37, and enters cylinders 23, 25. In this case, the pressure difference across both first pair of cylinders 21, 23 and second pair of cylinders 25, 27 equals the pressure difference across restrictor orifice 31.

If the dynamics of the overall system are well defined, then restrictor orifices 31, 33 may be of fixed restriction, i.e. variation of their restriction not possible. This saves cost. However, in a less well defined system, variable laminar orifices may be used to provide adjustable damping. The level of damping would then be adjusted to suit actual running conditions.

Hydraulic systems over the course of their operating life may suffer loss of incompressibility due to the formation of gas/air bubbles. This is of little consequence in many hydraulic systems, but in the case of the above described system may well result in inoperability, since an instantaneous damping torque is required in response to very small angular displacements. Gas/air bubbles form due to cavitation in the hydraulic fluid, i.e. negative pressure in the hydraulic fluid which results in the gas/air normally present in a hydraulic fluid coming out of solution to form gas/air bubbles. Cavitation typically occurs when a hydraulic fluid is drawn into a chamber by expansion of the chamber. In the above described system, cavitation is prevented by the use of: (i) pressurized reservoir 29; and (ii) check valves 35, 37 in parallel with restrictor orifices 31, 33 (the check valves allow hydraulic fluid to bypass the restrictor orifices when flowing to a cylinder 21, 23, 25, 27, thereby enabling a fast response to an expanding cylinder 21, 23, 25, 27).

It is to be noted that pressurized reservoir 29 compensates for volume fluctuations within the hydraulic circuit. Such fluctuations might occur due to: wear (e.g. at the contact surfaces where actuation levers 13a, 13b abut pistons 21a, 23a, 25a, 27a), temperature change, and hydraulic fluid leakage.

The hydraulic damping circuit of FIG. 4 is the same as that of FIG. 3 but with hydraulic cylinders 25, 27 of FIG. 3 omitted. It is to be appreciated that the circuit of FIG. 4 can be used to damp the vibration of any component 41 in the dimension in which the actions of pistons 21a, 23a of cylinders 21, 23 oppose one another. Thus, movement of component 41 to the right in FIG. 4 causes hydraulic fluid to leave cylinder 23, cross restrictor orifice 33, enter and leave pressurized reservoir 29, cross check valve 35, and enter cylinder 21. The pressure difference across cylinders 21, 23 equals the pressure difference across restrictor orifice 33. Movement of component 41 to the left in FIG. 4 results in the reverse operation, and the pressure difference across cylinders 21, 23 then equals the pressure difference across restrictor orifice 31.

The hydraulic damping circuit of FIG. 5 is the same as that of FIG. 4 but with a different manner of communication with component 41. Component 41, rather than being directly in line between opposing cylinders 21, 23, is now positioned above its previous position. A single piece 43 joins pistons 21a, 23a, and a further piece 45 is secured in rigid manner to piece 43 and extends perpendicularly from piece 43 to component 41. Piece 45 is secured in rigid manner to component 41. As before, component 41 vibrates in the dimension in which pistons 21a, 23a oppose one another. This results in inward/outward movement of pistons 21a, 23a giving rise to corresponding hydraulic fluid flow between cylinders 21, 23 to damp the vibration.

In the hydraulic damping circuit of FIG. 6, cylinders 21, 23 and their pistons 21a, 23a are constituted by a single hydraulic chamber 47 and a single piece 49 which moves to the left and right in FIG. 6 within chamber 47. A slot 51 is cut in single piece 49 and receives component 41. As before, component 41 vibrates in the dimension in which pistons 21a, 23a oppose one another. This results in inward/outward movement of pistons 21a, 23a giving rise to corresponding fluid flow between cylinders 21, 23 to damp the vibration.

The modifications of FIGS. 5 and 6 could of course be applied to the hydraulic damping circuit of FIG. 3, in respect of the communication between pistons 21a, 23a, 25a, 27a and actuation levers 13a, 13b.

In the hydraulic damping circuits of FIGS. 3 to 6, hydraulic cylinders respond to the vibration to be damped by pumping fluid first in one direction and then in the other in the hydraulic circuit. It is to be appreciated that this could be achieved by other suitable pumping means, e.g. vanes or gear forms.

In the above described apparatus for damping the torsional excitation of a drive shaft, a transfer tube concentric with the shaft, surrounding the shaft, and secured to one end of the shaft, transfers the angular twist of this one end to a damper secured to the other end of the shaft. It is to be appreciated that this transfer could be achieved by other suitable means secured to the one end of the shaft and extending along the shaft to the damper secured to the other end of the shaft, e.g. such other means might comprise a solid cylindrical member concentric with and disposed inside a hollow drive shaft.

The invention claimed is:

1. An apparatus for damping a torsional excitation of a drive shaft, comprising:
   a tube extending along the drive shaft having one end secured to the drive shaft;
   a first actuation lever and second actuation lever extending from an end of the tube opposite the end secured to the drive shaft, the first and second levers located on opposite sides of the tube;
   a hydraulic damper for damping vibration of the first and second actuation levers, comprising:
      a first pair and second pair of hydraulic cylinders, each hydraulic cylinder having a piston, and
      a fluid flow path between the cylinders,
         wherein the first pair of hydraulic cylinders are arranged so that the actions of the pistons of the cylinders oppose one another in a dimension of vibration of the first actuation lever, the pistons communicating with the first actuation lever,
         wherein the second pair of hydraulic cylinders are arranged so that the actions of the pistons of the cylinders oppose one another in the dimension of vibration of the second actuation lever, the pistons communicating with the second actuation lever, and
         wherein the torsional excitation of the tube causing vibration of the first and second actuation levers resulting in a fluid flow between the cylinders to damp the vibration.

2. An apparatus according to claim 1,
   wherein the tube includes a radially inwardly extending support located at the end of the tube opposite the end secured to the drive shaft, and
   wherein the support bearing against the drive shaft so as to maintain concentricity of the tube and the drive shaft.

3. The apparatus according to claim 2, wherein the fluid flow path between the cylinders includes a pressurized reservoir.

4. The apparatus according to claim 3, wherein the fluid flow path comprises:
   a pressurized reservoir,
   a first section and second section, each section comprising a first and second branch connected in parallel, the first branch comprising a flow restrictor, the second branch comprising a check valve permitting fluid flow only in a direction away from the reservoir,
   wherein the first pair of cylinders comprise a first cylinder and a second cylinder,
   wherein the first section is connected between the reservoir and the first cylinder and a diagonally opposite cylinder of the second pair,
   wherein the second section is connected between the reservoir and the second cylinder and a diagonally opposite cylinder of the second pair.

5. The apparatus according to claim 1 wherein the fluid flow path between the cylinders includes a pressurized reservoir.

6. The apparatus according to claim 5, wherein the fluid flow path further comprises:
   a first section and second section, each section comprising a first and second branch connected in parallel, the first branch comprising a flow restrictor, the second branch comprising a check valve permitting fluid flow only in a direction away from the reservoir, wherein the first pair of cylinders comprise a first cylinder and a second cylinder, wherein the first section is connected between the reservoir and the first cylinder and a diagonally opposite cylinder of the second pair, wherein the second section is connected between the reservoir and the second cylinder and a diagonally opposite cylinder of the second pair.

* * * * *

UNITED STATES PATENT AND TRADEMARK OFFICE
CERTIFICATE OF CORRECTION

PATENT NO.        : 7,654,907 B2
APPLICATION NO.   : 11/628229
DATED             : February 2, 2010
INVENTOR(S)       : Grahame Knowles It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 494 days.

Signed and Sealed this

Twenty-third Day of November, 2010

David J. Kappos
*Director of the United States Patent and Trademark Office*